US011775024B1

(12) United States Patent
Jiang

(10) Patent No.: US 11,775,024 B1
(45) Date of Patent: Oct. 3, 2023

(54) DISPLAY DEVICE AND DRIVING METHOD

(71) Applicant: Wuhan Tianma Micro-Electronics Co., Ltd., Wuhan (CN)

(72) Inventor: Yan Jiang, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 17/829,826

(22) Filed: Jun. 1, 2022

(30) Foreign Application Priority Data

Mar. 25, 2022 (CN) .......................... 202210307590.7

(51) Int. Cl.
*G06F 1/16* (2006.01)
*F16M 11/04* (2006.01)
*F16M 11/18* (2006.01)

(52) U.S. Cl.
CPC .......... *G06F 1/1675* (2013.01); *F16M 11/046* (2013.01); *F16M 11/18* (2013.01); *G06F 1/1652* (2013.01); *F16M 2200/065* (2013.01); *F16M 2200/066* (2013.01)

(58) Field of Classification Search
CPC .................................................... G06F 1/1652
See application file for complete search history.

(56) References Cited

U.S. PATENT DOCUMENTS

| | | | | |
|---|---|---|---|---|
| 6,771,232 B2 * | 8/2004 | Fujieda | ................. | G06F 1/1647 345/55 |
| 8,654,519 B2 * | 2/2014 | Visser | ..................... | G09F 11/30 361/679.21 |
| 9,337,434 B2 * | 5/2016 | Lindblad | ................ | G06F 1/1652 |
| 9,772,657 B2 * | 9/2017 | Takayanagi | ......... | H04M 1/0268 |
| 10,019,036 B2 * | 7/2018 | Sun | ........................ | G06F 1/1652 |
| 10,117,346 B2 * | 10/2018 | Yang | ..................... | G06F 1/1652 |
| 10,152,085 B2 * | 12/2018 | Sun | .................... | G02F 1/133526 |
| 10,334,750 B2 * | 6/2019 | Koo | .................... | H04M 1/0268 |
| 11,064,300 B2 * | 7/2021 | Kim | ....................... | H04R 7/045 |
| 11,127,323 B2 * | 9/2021 | Kim | ....................... | G06F 1/1641 |
| 11,516,927 B2 * | 11/2022 | Hirakata | ................ | H10K 50/84 |

(Continued)

FOREIGN PATENT DOCUMENTS

| | | |
|---|---|---|
| CN | 210223370 U | 3/2020 |
| CN | 111508372 A | 8/2020 |
| CN | 111599278 A | 8/2020 |

*Primary Examiner* — Adrian S Wilson
(74) *Attorney, Agent, or Firm* — ANOVA LAW GROUP PLLC

(57) ABSTRACT

A display device and a driving method of the display device are provided. The display device includes a case, a first reel, a flexible display screen, and a retractable component. The first reel is located inside the case. The flexible display screen is wound on the first reel, and is retractable or expandable along a first direction. The retractable component includes a first retractable component including N retractable parts that are capable of sliding with respect to each other along the first direction, where N is a positive integer greater than or equal to 2. When the flexible display screen is expanded, the N retractable parts are expanded along the first direction and are arranged along a second direction, where the second direction intersects the first direction. When the flexible display screen is retracted, the N retractable parts are arranged in sequence along the second direction.

18 Claims, 7 Drawing Sheets

(56) References Cited

U.S. PATENT DOCUMENTS

| | | | | |
|---|---|---|---|---|
| 11,626,041 | B2* | 4/2023 | Park | G06F 1/1681 |
| | | | | 361/679.01 |
| 2009/0302176 | A1* | 12/2009 | Kuroi | F16M 11/26 |
| | | | | 248/176.1 |
| 2012/0204453 | A1* | 8/2012 | Jung | G09F 9/301 |
| | | | | 40/517 |
| 2013/0265221 | A1* | 10/2013 | Lee | H04N 21/4222 |
| | | | | 345/156 |
| 2015/0325804 | A1* | 11/2015 | Lindblad | H10K 77/111 |
| | | | | 313/511 |
| 2019/0132987 | A1* | 5/2019 | Koo | H05K 7/18 |
| 2019/0207141 | A1* | 7/2019 | Kim | H10K 77/111 |
| 2019/0324501 | A1* | 10/2019 | Kim | H05K 5/0017 |
| 2020/0068727 | A1* | 2/2020 | Zhang | H05K 5/0217 |
| 2021/0365083 | A1* | 11/2021 | Li | C08J 7/042 |
| 2022/0171434 | A1* | 6/2022 | Park | G06F 1/183 |
| 2023/0087798 | A1* | 3/2023 | Chu | G06F 1/1681 |
| | | | | 361/679.01 |
| 2023/0152855 | A1* | 5/2023 | Liu | G06F 1/1681 |
| | | | | 361/679.01 |

* cited by examiner

31

100

DISPLAY DEVICE AND DRIVING METHOD

CROSS-REFERENCE TO RELATED APPLICATION

This application claims the priority of Chinese patent application No. 202210307590.7, filed on Mar. 25, 2022, the entirety of which is incorporated herein by reference.

FIELD

The present disclosure generally relates to the field of display technology and, more particularly, relates to a display device and a driving method of a display device.

BACKGROUND

A display screen is often provided on an outer surface of smart electronic products to allow functions such as emitting light or displaying content. The user experience may then be improved. However, the display screen on the outer surface of the existing electronic products is often a rigid screen fixed on an outer wall of a case, which only has a single form and cannot meet more diverse needs.

Moreover, the existing electronic product often has a plane shape, which takes up too much space and is unportable. With the development of the flexible screen, how to provide an electronic product that does not take up too much space and is storable and portable is an urgent technical problem that needs to be solved.

SUMMARY

One aspect of the present disclosure provides a display device. The display device includes a case and a first reel, where the first reel is located inside the case. The display device also includes a flexible display screen. The flexible display screen is capable of being wound on the first reel, and is retractable or expandable along a first direction according to rotation of the first reel. Further, the display device includes a retractable component disposed on a non-light-exiting surface of the flexible display screen and configured to support the flexible display screen to retract or expand. The retractable component includes a first retractable component, and the first retractable component includes N retractable parts that are capable of sliding with respect to each other along the first direction, where N is a positive integer greater than or equal to 2. When the flexible display screen is expanded, the N retractable parts of the retractable component are expanded along the first direction and are arranged along a second direction, where the second direction intersects the first direction. When the flexible display screen is retracted, the N retractable parts of the retractable component are arranged in sequence along the second direction.

Another aspect of the present disclosure provides a driving method of a display device. The display device includes a case and a first reel, where the first reel is located inside the case. The display device also includes a flexible display screen. The flexible display screen is capable of being wound on the first reel, and is retractable or expandable along a first direction according to rotation of the first reel. Further, the display device includes a retractable component disposed on a non-light-exiting surface of the flexible display screen and configured to support the flexible display screen to retract or expand. The retractable component includes a first retractable component, and the first retractable component includes N retractable parts that are capable of sliding with respect to each other along the first direction, where N is a positive integer greater than or equal to 2. When the flexible display screen is expanded, the N retractable parts of the retractable component are expanded along the first direction and are arranged along a second direction, where the second direction intersects the first direction. When the flexible display screen is retracted, the N retractable parts of the retractable component are arranged in sequence along the second direction. The driving method includes controlling at least a portion of the retractable parts of the retractable component to expand to an outside of the case along the first direction, to drive the flexible display screen to expand. The driving method also includes controlling at least a portion of the retractable parts of the retractable component to retract to an inside of the case along the first direction, to drive the flexible display screen to retract.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

The present disclosure provides a display device and a driving method of a display device, to solve the problems that electronic products occupy too much space and are not portable.

Figure 1:
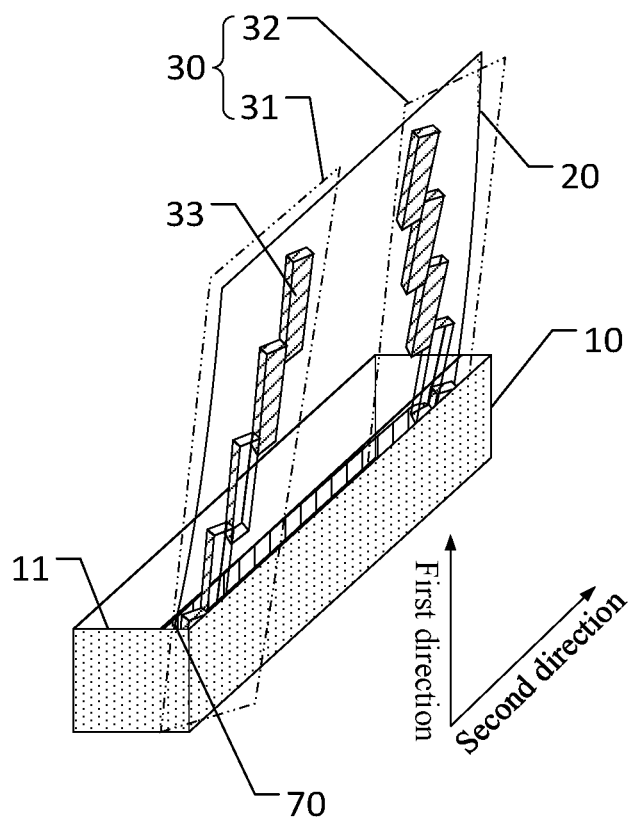
FIG. 1 illustrates a schematic diagram of an expanded flexible display screen in an exemplary display device consistent with disclosed embodiments of the present disclosure.
Figure 2:
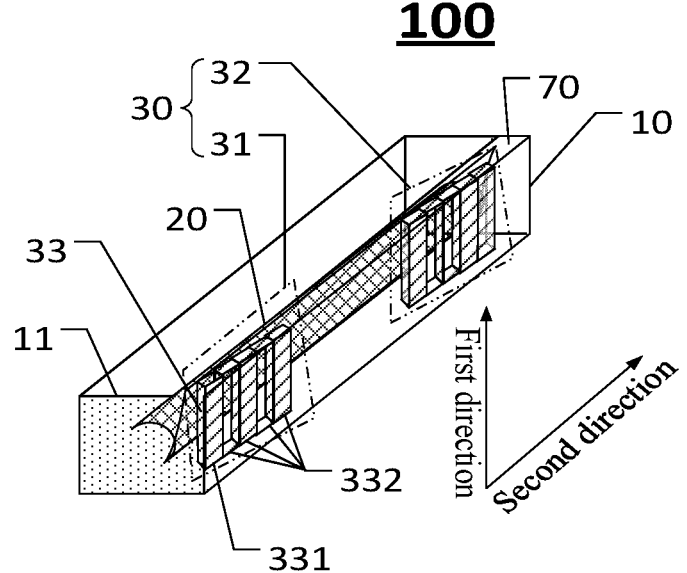
FIG. 2 illustrates a schematic diagram of a retracted flexible display screen in an exemplary display device consistent with disclosed embodiments of the present disclosure.

FIG. 1 illustrates a schematic diagram of an expanded flexible display screen in a display device consistent with disclosed embodiments of the present disclosure; and FIG. 2 illustrates a schematic diagram of a retracted flexible display screen in a display device consistent with disclosed embodiments of the present disclosure. Referring to FIG. 1 and FIG. 2, a display device 100 may include a case 10 and a first reel 11, where the first reel 11 may be located inside the case 10. The display device 100 may also include a flexible display screen 20, where the flexible display screen 20 may be wound on the first reel 11, and may be retractable or expandable along a first direction according to the rotation of the first reel 11. In addition, the display device 100 may include at least one retractable component 30. The retractable component may be disposed on a non-light-exiting surface of the flexible display screen 20, and may be configured to support the flexible display screen 20 to retract or expand.

The at least one retractable component 30 may include a first retractable component 31, and the first retractable component 31 may include N retractable parts 33 that are capable of sliding along the first direction, where N may be a positive integer greater than or equal to 2.

Referring to FIG. 1, when the flexible display screen 20 is expanded, the N retractable parts 33 of the retractable component 30 may be expanded along the first direction and may be arranged along a second direction. The second direction may intersect the first direction.

Referring to FIG. 2, when the flexible display screen 20 is retracted, the N retractable parts 33 of the retractable component 30 may be arranged in sequence along the second direction.

The present disclosure provides a display device 100. The display device 100 may include the case 10, and the first reel 11 disposed inside the case 10. The first reel 11 may be configured to wind or unwind the flexible display screen 20. In one embodiment, one end of the flexible display screen 20 may be wound on the first reel 11, and may be retracted or expanded along the first direction according to the rotation of the first reel 11. Therefore, the flexible display screen 20 may be expanded to the outside of the case 10 in the display device 100 when being used, and may be rolled up inside the case 10 when not being used, which may facilitate to prevent the display device 100 from occupying too much space, thereby realizing the storage function of the display device 100 and making the display device 100 substantially portable.

The disclosed display device 100 may further include the retractable component 30. The retractable component 30 may be disposed on the non-light-exiting surface of the flexible display screen 20, to avoid blocking the display screen of the flexible display screen 20. The retractable component 30 may be configured to support the flexible display screen 20 in an expanded state, and at the same time, may be configured to support a portion of the flexible display screen 20 in a retracted state. When the flexible display screen 20 is in the expanded state, the retractable component 30 may support the flexible display screen 20, which may avoid the problem where a portion of the display screen cannot be observed due to the rolling of the portion of the flexible display screen 20 expanded to the outside of the case 10.

In one embodiment, the retractable component 30 in the display device 100 may include the first retractable component 31, and the first retractable component 31 may include two or more retractable parts 33 that are capable of sliding along the first direction. Two adjacent retractable parts 33 may be slidingly connected. Referring to FIG. 1, when the flexible display screen 20 is expanded, all the retractable parts 33 included in the retractable component 30 may be expanded by sliding along the first direction, and may be arranged along the second direction, such that the retractable component 30 may be configured to support the expanded flexible display screen 20 and to prevent a portion of the expanded flexible display screen 20 from rolling. Referring to FIG. 2, when the flexible display screen 20 is retracted, all the retractable parts 33 included in the retractable component 30 may be arranged in sequence along the second direction. In other words, all the retractable parts 33 may be retracted by sliding along the first direction, and merely certain retractable parts 33 may support the flexible display screen 20. When both the flexible display screen 20 and the retractable component 30 are in the retracted state, both the flexible display screen 20 and the retractable component 30 may be retracted to the inside the case 10 of the display device 100, which may facilitate to prevent the display device 100 from occupying too much space, may achieve the storage function of the display device 100, such that the display device 100 may be substantially portable.

Referring to FIG. 1 and FIG. 2, in one embodiment, the at least one retractable component 30 may further include a second retractable component 32. The first retractable component 31 and the second retractable component 32 may have the same structure.

In one embodiment, in addition to the first retractable component 31 including a plurality of retractable parts 33 that are capable of sliding, the at least one retractable component may further include the second retractable component 32. The first retractable component 31 and the second retractable component 32 may have the same structure. In other words, the second retractable component 32 may also include a plurality of retractable parts 33, and the quantity of retractable parts 33 included in the first retractable component 31 may be the same as the quantity of retractable parts 33 included in the second retractable component 32.

In other words, for example, referring to FIG. 1 and FIG. 2, the first retractable component 31 may include five retractable parts 33, the second retractable component 32 in the same display device 100 may also include five retractable parts 33. The dimensions and specifications of the retractable parts 33 corresponding to each other in the first retractable component 31 and the second retractable component 32 may be the same.

Figure 3:
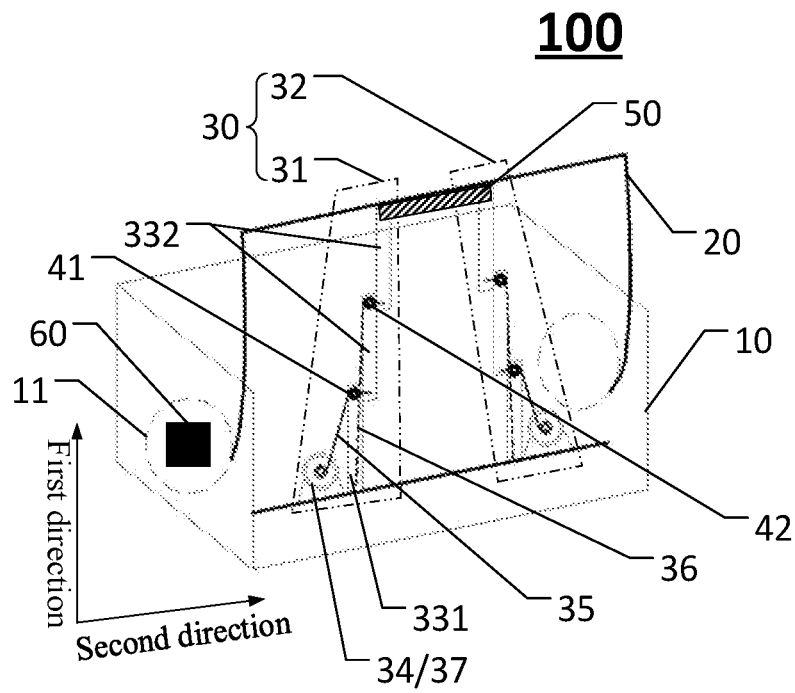
FIG. 3 illustrates a schematic diagram of an expanded flexible display screen in another exemplary display device consistent with disclosed embodiments of the present disclosure.

FIG. 3 illustrates a schematic diagram of an expanded flexible display screen in another display device consistent with disclosed embodiments of the present disclosure. Referring to FIGS. 1-3, the first retractable component 31 and the second retractable component 32 may be disposed symmetrically.

In one embodiment, when the display device 100 includes the first retractable component 31 and the second retractable component 32, the first retractable component 31 and the second retractable component 32 may be disposed symmetrically. In other words, the first retractable component 31 and the second retractable component 32 in the same display device 100 may be disposed in a symmetrical pattern.

In one embodiment, the portion of the flexible display screen 20 in the display device 100 that is expanded to the outside of the case 10 may have a regular pattern, such as a rectangle. The first retractable component 31 and the second retractable component 32 that are disposed symmetrically may be disposed at symmetrical positions of the rectangular flexible display screen 20, to support the flexible display screen 20, which may ensure desired support of the flexible display screen 20 by the at least one retractable component 30.

Figure 4:
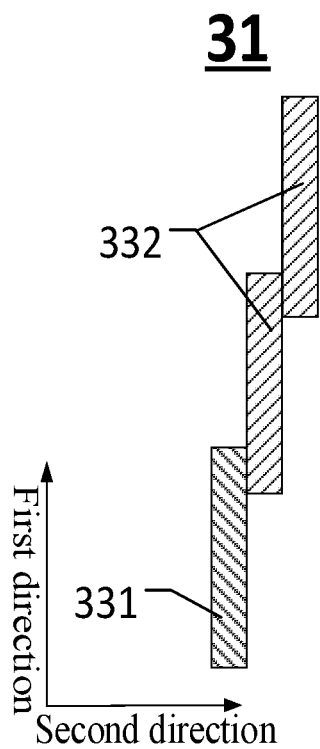
FIG. 4 illustrates a schematic local zoom-in view of a first retractable component in the display device in FIG. 3 consistent with disclosed embodiments of the present disclosure.

FIG. 4 illustrates a schematic local zoom-in view of the first retractable component in the display device in FIG. 3. Referring to FIGS. 1-4, the N retractable parts 33 may include one first retractable part 331 and M second retractable parts 332, where N=M+1 and M may be a positive integer greater than or equal to 1.

Referring to FIG. 2, when the flexible display screen 20 is in a retracted state, the one first retractable part 331 and the M second retractable parts 332 may be arranged in sequence along the second direction. An end of the retractable part 33 close to the case 10 may be a first end, and another end of the retractable part 33 facing toward an expanding direction of the flexible display screen 20 may be a second end.

When the flexible display screen 20 is in an expanding process, the first retractable part 331 may remain stationary, and the M second retractable parts 332 may move in sequence along the first direction. The first end of a second retractable part 332 adjacent to the first retractable part 331 may move along the first direction to approach the second end of the first retractable part 331, and the second end of the second retractable part 332 may move along the first direction toward a direction away from the second end of the first retractable part 331.

In one embodiment, the first retractable component 31 included in the retractable component 30 may be used as an example. The plurality of retractable parts 33 included in the first retractable component 31 may include one first retractable part 331, and the rest of the plurality of retractable parts 33 may include the second retractable parts 332.

Referring to FIG. 2, when the flexible display screen 20 is in the retracted state, the one first retractable part 331 and the remaining at least one second retractable part 332 in the first retractable component 31 may be arranged in sequence along the second direction. In view of this, each retractable part 33 may be retracted to the inside of the case 10, such that when the flexible display screen 20 is in the retracted state, the corresponding display device 100 may occupy substantially small space, which may almost be equal to the volume of the case 10 of the display device 100.

It should be noted that in one embodiment, the end of each retractable part 33 adjacent to the case 10, or the end of each retractable part 33 away from the expanding direction of the flexible display screen 20 may be the first end, and the end of each retractable part 33 facing toward the expanding direction of the flexible display screen 20 may be the second end. It should be noted that the disclosed retractable part 33 may have a long strip shape, and the two ends of the long strip may be the first end and the second end, respectively.

Referring to FIG. 3 and FIG. 4, when the flexible display screen 20 is in the expanding process, the first end of the first retractable part 331 may be configured to be fixed inside the case 10. In other words, the first retractable part 331 may remain stationary, and the remaining second retractable parts 332 may slide in sequence along the first direction. In one embodiment, the first end of a second retractable part 332 adjacent to the first retractable part 331 may move along the first direction to approach the second end of the first retractable part 331, and the second end of the second retractable part 332 adjacent to the first retractable part 331 may move along the first direction toward a direction away from the second end of the first retractable part 331. In other words, the second retractable part 332 may overall slide toward the second end of the first retractable part 331 along the first direction, such that at least a portion of the second retractable part 332 disposed adjacent to the first retractable part 331 may slide toward outside of the case 10.

In one embodiment, when the first retractable component 31 merely includes one first retractable part 331 and one second retractable part 332, the first end of the first retractable part 331 may be fixed to the inside of the case 10, the second retractable part 332 may slide along the first direction toward a direction away from the first end of the first retractable part 331, to drive the corresponding flexible display screen 20 to expand toward the outside of the case 10 through the second retractable part 332. When the flexible display screen 20 is in the expanding process, the sliding of the second retractable part 332 may not only drive the expanding of the flexible display screen 20, but also support the flexible display screen 20, which may facilitate users' use.

Referring to FIGS. 1-4, the N retractable parts 33 may include one first retractable part 331 and M second retractable parts 332, where M may be a positive integer greater than or equal to 2.

The M second retractable parts 332 may include the $i^{th}$ second retractable part 332 adjacent to the first retractable part 331 and the $(i+1)^{th}$ second retractable part 332 away from the first retractable part 331, where $1 \leq i < i+1 \leq M$, and i may be a positive integer. When the flexible display screen 20 is in the expanding process, the first retractable part 331 may remain stationary, the $(i+1)^{th}$ second retractable part 332 may move as the $i^{th}$ second retractable part 332 moves. The first end of the $(i+1)^{th}$ second retractable part 332 may move along the first direction to approach the second end of the $i^{th}$ second retractable part 332, and the second end of the $(i+1)^{th}$ second retractable part 332 may move along the first direction away from the second end of the $i^{th}$ second retractable part 332.

In one embodiment, in addition to the above-mentioned embodiment where the first retractable component 31 may include one first retractable part 331 and one second retractable part 332, the present disclosure also provides another embodiment where the first retractable component 31 may include one first retractable part 331 and two second retractable parts 332 (e.g., i=1), as shown in FIG. 3 and FIG. 4.

In view of this, the two second retractable parts 332 included in the first retractable component 31 may include the $1^{st}$ second retractable part 332 and the $2^{nd}$ second retractable part 332. The $1^{st}$ second retractable part 332 may be disposed adjacent to the first retractable part 331, and the $2^{nd}$ second retractable part 332 may be disposed adjacent to the $1^{st}$ second retractable part 332. In other words, the $2^{nd}$ second retractable part 332 may be disposed on a side of the $1^{st}$ second retractable part 332 away from the first retractable part 331.

In view of this, when the flexible display screen 20 is in the expanding process, the first end of the first retractable part 331 may be fixed inside the case 10. Therefore, the first retractable part 331 may remain stationary, while the $2^{nd}$ second retractable part 332 may move as the $1^{st}$ second retractable part 332 moves. The first end of the $2^{nd}$ second retractable part 332 may move along the first direction to approach the second end of the $1^{st}$ second retractable part 332, and the second end of the $2^{nd}$ second retractable part 332 may move along the first direction away from the second end of the $1^{st}$ second retractable part 332. In other words, when the flexible display screen 20 is in the expanding process, the first retractable part 331 may remain stationary, the $1^{st}$ second retractable part 332 may slide along the first direction away from the first end of the first retractable part 331, the $2^{nd}$ second retractable part 332 may slide along the first direction away from the first end of the $1^{st}$ second retractable part 332. The $1^{st}$ second retractable part 332 may slide with respect to the first retractable part 331, and the $2^{nd}$ second retractable part 332 may slide with respect to the $1^{st}$ second retractable part 332. Therefore, at least a portion of both the $1^{st}$ second retractable part 332 and the $2^{nd}$ second retractable part 332 may slide to the outside of the case 10, and the $1^{st}$ second retractable part 332 and the $2^{nd}$ second retractable part 332 may drive the corresponding flexible display screen 20 to expand toward the outside of the case 10. When the flexible display screen 20 is in the expanding process, the sliding of the second retractable parts 332 (the $1^{st}$ second retractable part 332 and the $2^{nd}$ second retractable part 332) may not only drive the flexible display screen 20 to expand, but also support the flexible display screen 20, which may facilitate user's use.

It should be noted that i=1 may be merely an optional embodiment, which may not intend to limit the quantity of the second retractable parts 332. The value of i may be set to 2, 3, 4, 5, etc., according to practical applications.

Figure 5:
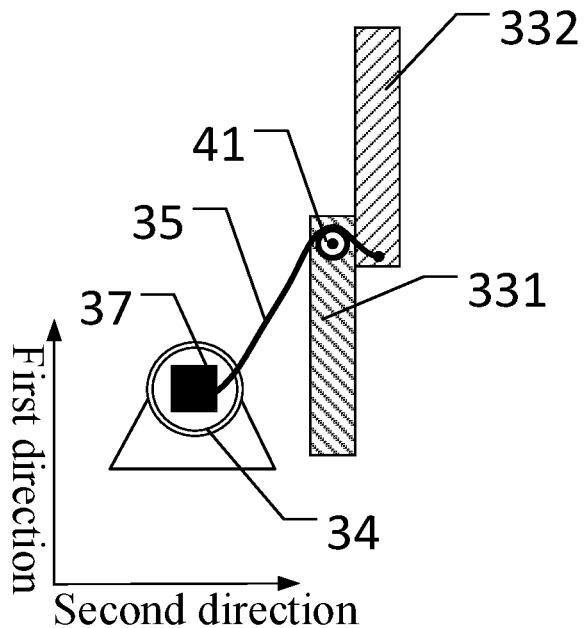
FIG. 5 illustrates a schematic local zoom-in view of a first retractable component of another exemplary display device consistent with disclosed embodiments of the present disclosure.
Figure 6:
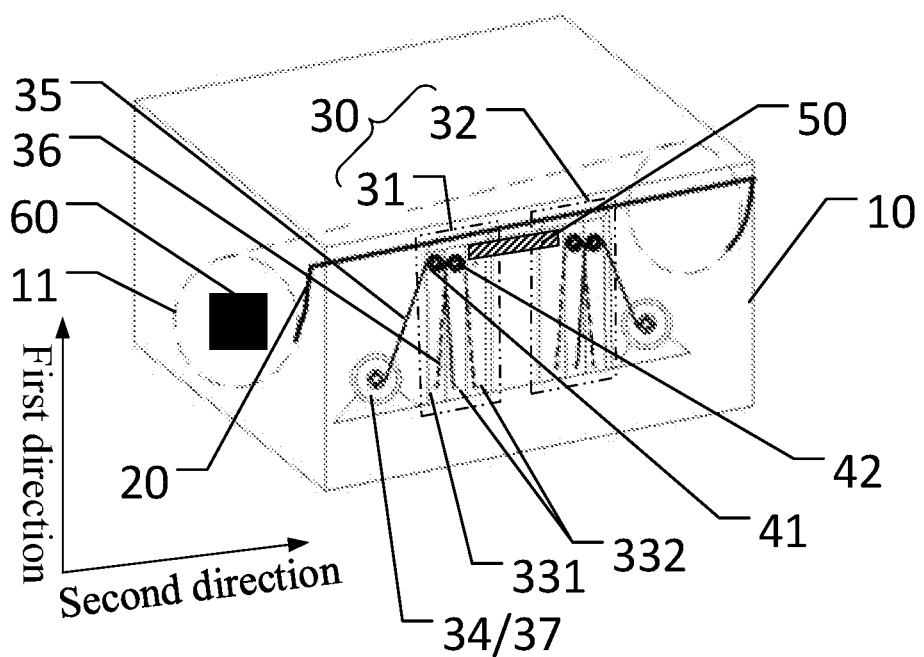
FIG. 6 illustrates a schematic diagram of a retracted flexible display screen in another exemplary display device consistent with disclosed embodiments of the present disclosure.

FIG. 5 illustrates a schematic local zoom-in view of a first retractable component of another display device consistent with disclosed embodiments of the present disclosure; and FIG. 6 illustrates a schematic diagram of a retracted flexible display screen in another display device consistent with disclosed embodiments of the present disclosure. Referring to FIGS. 1-3 and FIGS. 5-6, the first retractable component 31 may include a second reel 34 and a first flexible connecting component 35.

When the flexible display screen 20 is in the retracted state, the first end of the first flexible connecting component 35 may be wound on the second reel 34, and the second end of the first flexible connecting component 35 may be fixed to the first end of the second retractable part 332 adjacent to the first retractable part 331 after being wound around the second end of the first retractable part 331.

When the flexible display screen 20 is in the expanding process, the second reel 34 may wind the first flexible connecting component 35, and the first flexible connecting component 35 may pull the second retractable part 332 to move along the first direction, to enable at least a portion of the second retractable part 332 to expand to the outside of the case 10.

When the flexible display screen 20 is in the retracting process, the second reel 34 may unwind the first flexible connecting component 35, and the second retractable part 332 may move in a direction away from the first direction, such that at least a portion of the second retractable part 332 may be retracted to the inside of the case 10.

In one embodiment, when the first retractable component 31 includes one first retractable part 331 and one second retractable part 332, the first retractable component 31 may further include the second reel 34 and the first flexible connecting component 35.

In view of this, when the flexible display screen 20 is in the retracted state, the first end of the first flexible connecting component 35 may be wound on the second reel 34, and the second end of the first flexible connecting component 35 may be fixed to the first end of the second retractable part 332 adjacent to the first retractable part 331 after being wound around the second end of the first retractable part 331. In other words, referring to FIG. 5, the second reel 34 and the second retractable part 332 adjacent to the first retractable part 331 may be respectively disposed on both sides of the first retractable part 331. The second end of the first retractable part 331 may merely be an overlapping position with the first flexible connecting component 35. Along the second direction, the second reel 34 may be located at a similar position as the first end of the first retractable part 331. In other words, the second reel 34 may be located on the side of the first retractable part 331 away from the second end, and may be adjacent to the first end of the first retractable part 331.

In view of this, when the flexible display screen 20 is in the retracted state, in other words, after the first flexible connecting component 35 overlaps with the second end of the first retractable part 331, both the first end and the second end of the first flexible connecting component 35 may move toward a direction away from the second end of the first retractable part 331 and close to the first end of the first retractable part 331. Ultimately, the first end of the first flexible connecting component 35 may be wound on the second reel 34, and the second end of the first flexible connecting component 35 may be fixed to the first end of the second retractable part 332 disposed adjacent to the first retractable part 331.

When the flexible display screen 20 is in the expanding process, the second reel 34 may rotate along a direction to wind the first end of the first flexible connecting component 35, and the position where the first flexible connecting component 35 overlaps with the first retractable part 331 may move toward the second end of the first flexible connecting component 35. Therefore, the second end of the first flexible connecting component 35 may pull the second retractable part disposed adjacent to the first retractable part 331 to move along the first direction, to enable at least a portion of the second retractable part 332 to expand to the outside of the case 10. Therefore, the second reel 34 may wind the first flexible connecting component 35, and the first flexible connecting component 35 may drive the second retractable part 332 to slide. The sliding of the second retractable part 332 may not only drive the flexible display screen 20 to expand, but also may support the flexible display screen 20, which may facilitate user's use.

When the flexible display screen 20 is in the retracting process, the second reel 34 may be rotated in another direction to unwind the first end of the first flexible connecting component 35, and the position where the first flexible connecting component 35 overlaps with the first retractable part 331 may move toward the first end of the first flexible connecting component 35, such that the second end of the first flexible connecting component 35 may drive the second retractable part 332 disposed adjacent to the first retractable part 331 to move along the first direction, to enable a portion of the second retractable part 332 originally located outside of the case 10 to move to the inside of the case 10. Therefore, the second reel 34 may unwind the first flexible connecting component 35, and the first flexible connecting component 35 may drive the second retractable part 332 to slide. The sliding of the second retractable part 332 may drive the flexible display screen 20 to retract to the inside of the case 10, to achieve the storage of the flexible display screen 20, such that the display device 100 may merely occupy a substantially small space when not in use.

In one embodiment, referring to FIG. 5, the display device may further include a first driving motor 37. The first driving motor 37 may drive the second reel 34 to wind the first flexible connecting component 35, or may drive the second reel 34 to unwind the first flexible connecting component 35.

In the disclosed embodiments, the first driving motor 37 may be provided to drive the rotation of the second reel 34. The first driving motor 37 may be configured to drive the second reel 34 to wind the flexible connecting component 35, and may also be configured to drive the second reel 34 to unwind the first flexible connecting component 35, to achieve the sliding of the second retractable part 332 connected to the first flexible connecting component 35.

It should be noted that the method of providing the first driving motor 37 to drive the second reel may merely be an example, and any other device that is capable of driving the rotation of the second reel according to the practical applications may also be used, and the present disclosure may not be limited to the first driving motor 37.

It should be noted that the setting position of the first driving motor 37 shown in FIG. 5 may merely be an optional embodiment, which may not be used to limit the setting position of the first driving motor 37. The position of the first driving motor 37 may be adjusted according to the specific vacancy situation in the case 10, as long as the first driving motor 37 is capable of being used to drive the rotation of the second reel 34.

Figure 7:
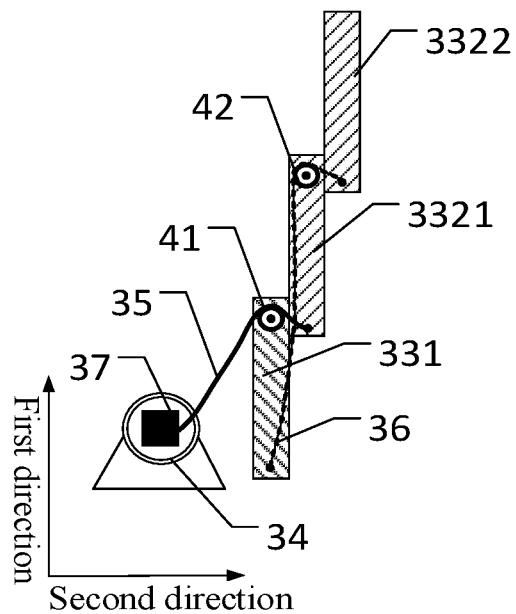
FIG. 7 illustrates a schematic local zoom-in view of a first retractable component of another exemplary display device consistent with disclosed embodiments of the present disclosure.

FIG. 7 illustrates a schematic local zoom-in view of a first retractable component of another display device consistent with disclosed embodiments of the present disclosure. Referring to FIGS. 3-4 and FIGS. 6-7, when the display device includes at least two second retractable parts 332, the retractable component 30 may further include at least one second flexible connecting component 36.

The at least two second retractable parts 332 may include a first sub-second retractable part 3321 and a second sub-second retractable part 3322 that are arranged along the second direction and disposed adjacent to each other. The first sub-second retractable part 3321 may be disposed adjacent to the first retractable part 331, and the second sub-second retractable part 3322 may be disposed on the side of the first sub-second retractable part 3321 away from the first retractable part 331.

A first end of the second flexible connecting component 36 may fixed to the first end of the first retractable part 331, and a second end of the second flexible connecting component 36 may be fixed to the first end of the second sub-second retractable part 3322 after being wound around the second end of the first sub-second retractable part 3321.

When the flexible display screen 20 is expanded, the second end of the second flexible connecting component 36 may drive each of the second retractable parts 332 connected to the second flexible connecting component 36 to move with respect to the first retractable part 331 or the second retractable part 332, such that at least a portion of each second retractable part 332 may be expanded to the outside of the case 10.

When the flexible display screen 20 is retracted, the second retractable part 332 may move toward a direction away from the first direction, such that the second retractable parts 332 may be retracted to the inside of the case 10.

In the disclosed embodiments, in addition to the one first retractable part 331, one second retractable part 332, the second reel 34 and the first flexible connecting component 35, the first retractable component 31 may include two second retractable parts 332 and the second flexible connecting component 36.

In other words, in view of this, the first retractable component 31 may include one first retractable part 331 and two second retractable parts 332. For illustrative purposes, the two second retractable parts 332 may include the first sub-second retractable part 3321 and the second sub-second retractable part 3322 that are arranged along the second direction and disposed adjacent to each other as an example. The first sub-second retractable part 3321 may be disposed adjacent to the first retractable part 331 and may be capable of sliding with respect to the first retractable part 331. The second sub-second retractable part 3322 may be disposed on the side of the first sub-second retractable part 3321 away from the first retractable part 331, and may be capable of sliding with respect to the first sub-second retractable part 3321.

It should be noted that the first flexible connecting component 35 may be configured to drive the first sub-second retractable part 3321 to slide with respect to the first retractable part 331. When the first retractable component 31 includes one first retractable part 331 and two second retractable parts 332, the first end of the second flexible connecting component 36 may be fixed to the first end of the first retractable part 331, and the second end of the second flexible connecting component 36 may be fixed to the first end of the second sub-second retractable part 3322 after being wound around the second end of the first sub-second retractable part 3321. In view of this, when the flexible display screen 20 is in the retracted state, after the second flexible connecting component 36 overlaps with the second end of the first sub-second retractable part 3321, both the first end and the second end of the second flexible connecting component 36 may move toward a direction away from the second end of the first sub-second retractable part 3321 and toward a direction close to the first end of the first sub-second retractable part 3321. Therefore, the first end of the second flexible connecting component 36 may be fixed to the first end of the first retractable part 331, and the second end of the second flexible connecting component 36 may be fixed to the first end of the second sub-second retractable part 3322.

When the flexible display screen 20 is in the expanding process, the second reel 34 may rotate in one direction to wind the first end of the first flexible connecting component 35. The position where the first flexible connecting component 35 overlaps with the first retractable part 331 may move toward the second end of the first flexible connecting component 35. Therefore, the second end of the first flexible connecting component 35 may pull the first sub-second retractable part 3321 to move along the first direction, such that at least a portion of the first sub-second retractable part 3321 may be expanded to the outside of the case 10. Because the first sub-second retractable part 3321 moves to the outside of the case 10, the position where the second flexible connecting component 36 overlaps with the first sub-second retractable part 3321 may move toward a direction close to the second end of the second flexible connecting component 36. Therefore, the second end of the second flexible connecting component 36 may drive the second sub-second retractable part 3322 to move along the first direction, to enable at least a portion of the second sub-second retractable part 3322 to expand to the outside of the case 10.

Therefore, the second reel 34 may wind the first flexible connecting component 35, and the first flexible connecting component 35 may drive the first sub-second retractable part 3321 to slide, thereby driving the second flexible connecting component 36 to drive the second sub-second retractable part 3322 to slide. The sliding of the second retractable part 332 (the first sub-second retractable part 3321 and the second sub-second retractable part 3322) may not only expand the flexible display screen 20, but also support the flexible display screen 20, which may facilitate user's use.

It should be noted that when the quantity of the second retractable parts 332 is substantially large, the quantity of corresponding second flexible connecting components 36 may increase. In view of this, the second end of each second flexible connecting components 36 may be configured to drive each second retractable part 332 connected to the corresponding second flexible connecting components 36 to slide with respect to the first retractable part 331 or the adjacent second retractable part 332, such that at least a portion of each second retractable part 332 may be expanded to the outside of the case 10.

When the flexible display screen 20 is in the retracting process, the second reel 34 may rotate in another direction to unwind the first end of the first flexible connecting component 35. The position where the first flexible connecting component 35 overlaps with the first retractable part 331 may move toward the first end of the first flexible connecting component 35. Therefore, the second end of the first flexible connecting component 35 may drive the first sub-second retractable part 3321 to move along the first direction, to enable the portion of the first sub-second retractable part 3321 originally located outside of the case 10 to move toward the inside of the case 10. Because the first sub-second retractable part 3321 moves toward the inside of the case 10, the position where the second flexible connecting component 36 overlaps with the first sub-second retractable part 3321 may move toward the first end of the second flexible connecting component 36. Therefore, the second end of the second flexible connecting component 36 may drive the second sub-second retractable part 3322 to move along the first direction, such that the portion of the second sub-second retractable part 3322 originally located outside of the case 10 may move to the inside of the case 10.

Therefore, the second reel 34 may unwind the first flexible connecting component 35, and the first flexible connecting component 35 may drive the first sub-second retractable part 3321 to slide. The sliding of the first sub-second retractable part 3321 may drive the position where the second flexible connecting component 36 overlaps with the first sub-second retractable part 3321 to move, thereby driving the sliding of the second sub-second retractable part 3322. The sliding of the second retractable part 332 (the first sub-second retractable part 3321 and the second sub-second retractable part 3322) may drive the flexible display screen 20 to retract to the inside of the case 10, to achieve the storage of the flexible display screen 20, such that the display device 100 may merely occupy a substantially small space when not in use.

Figure 8:
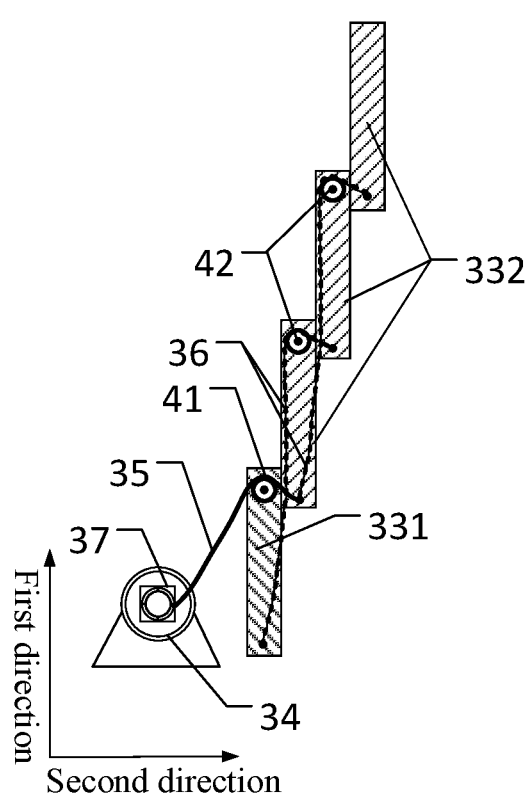
FIG. 8 illustrates a schematic local zoom-in view of a first retractable component of another exemplary display device consistent with disclosed embodiments of the present disclosure.

FIG. 8 illustrates a schematic local zoom-in view of a first retractable component of another display device consistent with disclosed embodiments of the present disclosure. Referring to FIGS. 3-4, FIG. 6 and FIG. 8, when the retractable component 30 includes at least two second retractable parts 332, the retractable component 30 may further include at least one second flexible connecting component 36.

The N retractable parts 33 may include M second retractable parts 332, where M may be a positive integer greater than or equal to 3. The plurality of second retractable parts 332 arranged along the second direction and disposed away from the first retractable part 331 may include j second retractable parts 332, where j may be a positive integer greater than or equal to 3. The first end of the $(j-2)^{th}$ second retractable part 332 may be fixedly connected to another second flexible connecting component 36, and the second flexible connecting component 36 may be fixed to the first end of the $j^{th}$ second retractable part 332 after being wound around the second end of the $(j-1)^{th}$ second retractable part 332.

In one embodiment, referring to FIG. 8, when the first retractable component 31 includes one first retractable part 331 and three second retractable parts 332, if all the three second retractable parts 332 are required to expand to the outside of the case 10 during the expanding process of the first retractable component 31, two second flexible connecting components 36 may need to be provided.

For example, the three second retractable parts 332 arranged in the second direction and sequentially disposed on the side away from the first retractable part 331 may include $1^{st}$ second retractable part 332, $2^{nd}$ second retractable part 332 and $3^{rd}$ second retractable part 332, respectively. The $1^{st}$ second retractable part 332 may be located between the first retractable part 331 and the $2^{nd}$ second retractable part 332, and the $2^{nd}$ second retractable part 332 may be located between the $1^{st}$ second retractable part 332 and the $3^{rd}$ second retractable part 332. In view of this, the first end of the first flexible connecting component 35 may be wound on the second reel 34, and the second end of the first flexible connecting component 35 may be fixed to the first end of the $1^{st}$ second retractable part 332 after being wound on the second end of the first retractable part 331. The first end of the $1^{st}$ second flexible connecting component 36 may be fixed on the first end of the first retractable part 331, and the second end of the $1^{st}$ second flexible connecting component 36 may be fixed to the first end of the $2^{nd}$ second retractable part 332 after being wound around the second end of the $1^{st}$ second retractable part 332. The first end of the $2^{nd}$ second flexible connecting component 36 may be fixed to the first end of the $1^{st}$ second retractable part 332, and the second end of the $2^{nd}$ second flexible connecting component 36 may be fixed to the first end of the $3^{rd}$ second retractable part 332 after being wound around the second end of the $2^{nd}$ second retractable part 332.

In view of this, when the second reel 34 rotates, the first flexible connecting component 35 may drive the $1^{st}$ second retractable part 332 to slide, the $1^{st}$ second flexible connecting component 36 may drive the $2^{nd}$ second retractable part 332 to slide, the $2^{nd}$ second flexible connecting component 36 may drive the $3^{rd}$ second retractable part 332 to slide. Therefore, the rotation of the second reel 34 may drive the movement of each second retractable part 332 in the first retractable component 31. When the display device 100 is in a display state, the flexible display screen 20 expanded to the outside of the case 10 may be supported by the plurality of second retractable parts 332. When the display device 100 is in a non-display state, each second retractable part 332 in the first retractable component 31 and the flexible display screen 20 may be accommodated inside the case 10, which may improve the user's experience and may reduce the space required for carrying the display device 100.

Figure 9:
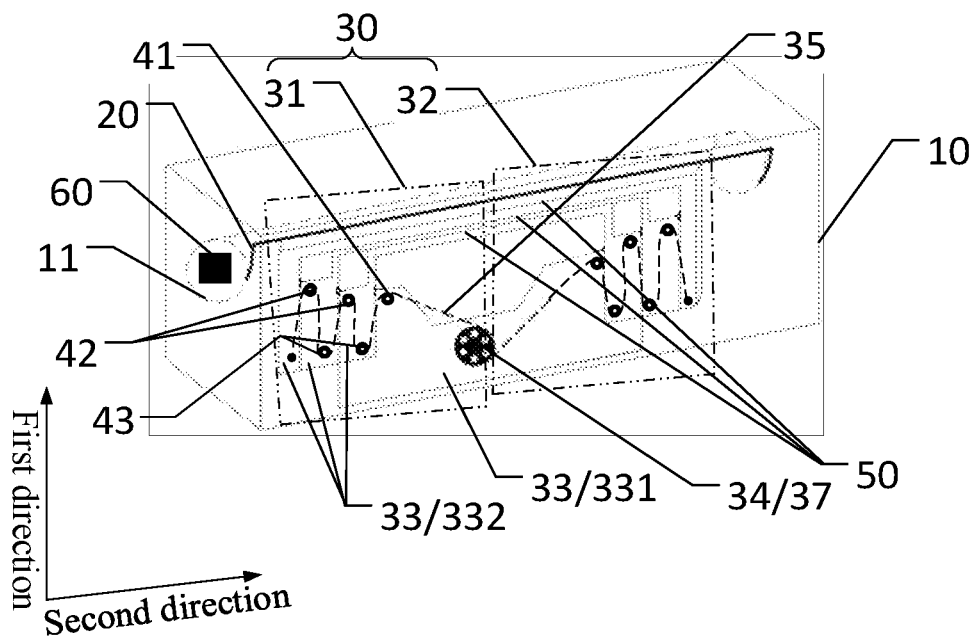
FIG. 9 illustrates a schematic diagram of a retracted flexible display screen in another exemplary display device consistent with disclosed embodiments of the present disclosure.
Figure 10:
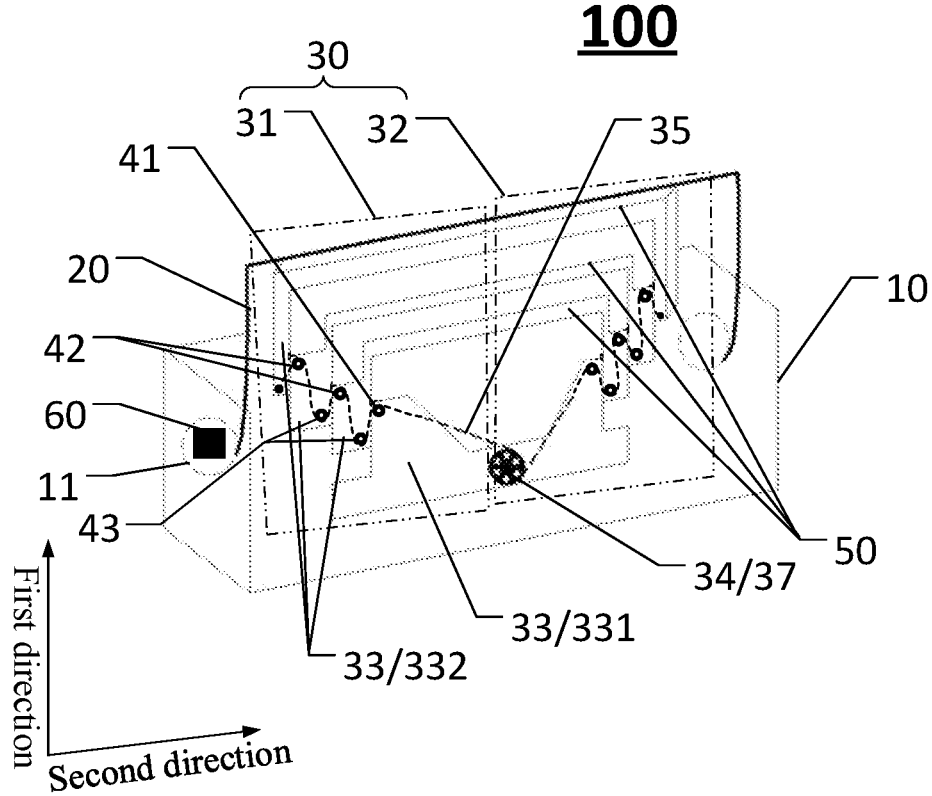
FIG. 10 illustrates a schematic diagram of an expanded flexible display screen in another exemplary display device consistent with disclosed embodiments of the present disclosure.
Figure 11:
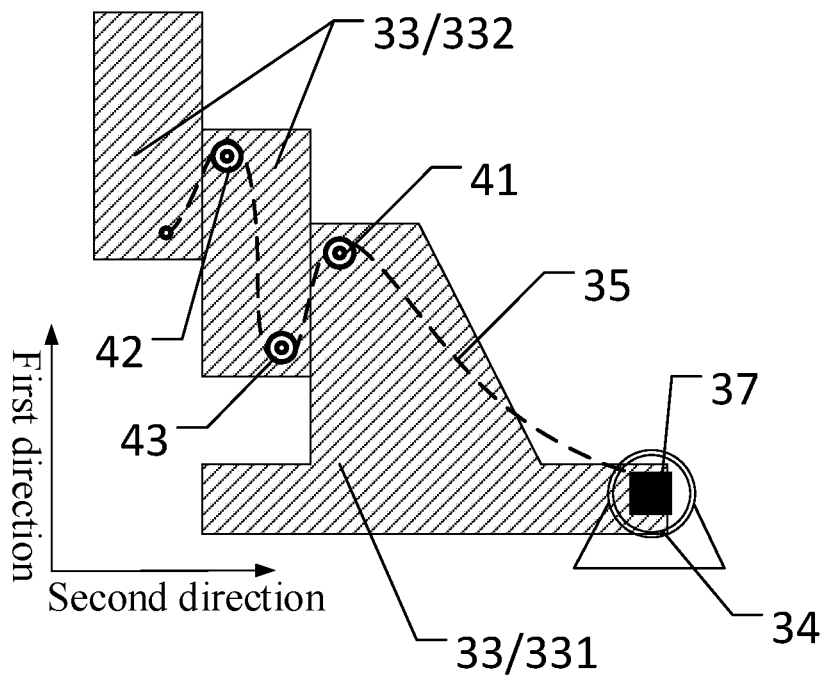
FIG. 11 illustrates a schematic local zoom-in view of a first retractable component in the display device in FIG. 8 consistent with disclosed embodiments of the present disclosure.

FIG. 9 illustrates a schematic diagram of a retracted flexible display screen in another display device consistent with disclosed embodiments of the present disclosure; FIG. 10 illustrates a schematic diagram of an expanded flexible display screen in another display device consistent with disclosed embodiments of the present disclosure; and FIG. 11 illustrates a schematic local zoom-in view of the first retractable component in the display device in FIG. 8. Referring to FIGS. 9-11, when the first retractable component includes at least two second retractable parts 332, the N retractable parts 33 may include M second retractable parts 332, where M may be a positive integer greater than or equal to 2.

When the flexible display screen 20 is in the retracted state, the first end of the first flexible connecting component 35 may be wound on the second reel 34, and the second end of the first flexible connecting component 35 may be fixed to the first end of the $M^{th}$ second retractable part 332 after being wound around the second end of the first retractable part 331, the first and second ends of each of the M−1 second retractable parts 332 sequentially disposed on the side of the first retractable part 331.

When the flexible display screen 20 is in the expanding process, the second reel 34 may wind the first flexible connecting component 35, and the first flexible connecting component 35 may drive each second retractable part 332 connected to the first flexible connecting component 35 to move with respect to the first retractable part 331 or the second retractable part 332, such that at least a portion of each second retractable part 332 may be expanded to the outside of the case 10.

When the flexible display screen 20 is in the retracting process, the second reel 34 may unwind the first flexible connecting component 35, and each second retractable part 332 may move away from the first direction, such that each second retractable part 332 may be retracted to the inside of the case 10.

It should be noted that the first flexible connecting component 35 may be shown by dotted lines in FIGS. 9-11, which may not mean that the first flexible connecting component 35 has an intermittent structure. The first flexible connecting component 35 may include uninterrupted structural component as an entity.

In one embodiment, referring to FIG. 11, the first retractable component 31 may include one first retractable part 331 and two second retractable parts 332. The two second retractable parts 332 may include the $1^{st}$ second retractable part 332 disposed adjacent to the first retractable part 331 and the $2^{nd}$ second retractable part 332 disposed on the side of the $1^{st}$ second retractable part 332 away from the first retractable part 331, respectively.

In one embodiment, referring to FIGS. 9-11, when the flexible display screen 20 is in the retracted state, the first end of the first flexible connecting component 35 may be wound on the second reel 34, and the second end of the first flexible connecting component 35 may be fixed to the first end of the $2^{nd}$ second retractable part 332 after being wound around the second end of the first retractable part 331, around the first end of the $1^{st}$ second retractable part 332, and around the second end of the $1^{st}$ second retractable part 332 in sequence.

In view of this, when the flexible display screen 20 is in the expanding process, the second reel 34 may rotate to wind the first end of the first flexible connecting component 35. The position where the first flexible connecting component 35 overlaps with the first retractable part 331 may move toward the second end of the first flexible connecting component 35. The $1^{st}$ second retractable part 332 may be driven to slide in the first direction, which may drive the positions where the first flexible connecting component 35 overlaps with the first end and the second end of the $1^{st}$ second retractable part 332 to move toward the second end of the first flexible connecting component 35. Further, the $2^{nd}$ second retractable part 332 may be driven to slide in the first direction, and both the $1^{st}$ second retractable part 332 and the $2^{nd}$ second retractable part 332 may slide along the first direction away from the first end of the first retractable part 331. In other words, at least a portion of the $1^{st}$ second retractable part 332 and the $2^{nd}$ second retractable part 332 may be expanded to the outside of the case 10. The movement of the $1^{st}$ second retractable part 332 and the $2^{nd}$ second retractable part 332 to the outside of the case 10 may not only drive the expanding of the flexible display screen 20, but also support the flexible display screen 20, which may facilitate user's use.

When the flexible display screen 20 is in the retracting process, the second reel 34 may rotate in another direction to unwind the first end of the first flexible connecting component 35. The position where the first flexible connecting component 35 overlaps with the first retractable part 331 may move toward the first end of the first flexible connecting component 35. The $1^{st}$ second retractable part 332 may be driven to slide in the first direction, which may drive the positions where the first flexible connecting component 35 overlaps with the first end and the second end of the $1^{st}$ second retractable part 332 to move toward the first end of the first flexible connecting component 35. Further, the $2^{nd}$ second retractable part 332 may be driven to slide in the first direction, and both the $1^{st}$ second retractable part 332 and the $2^{nd}$ second retractable part 332 may slide along the first direction close to the first end of the first retractable part 331. In other words, at least a portion of the $1^{st}$ second retractable part 332 and the $2^{nd}$ second retractable part 332 originally located outside of the case 10 may be retracted to the inside of the case 10. The shrink movement of the $1^{st}$ second retractable part 332 and the $2^{nd}$ second retractable part 332 toward the inside of the case 10 may drive the flexible display screen 20 to be accommodated inside the case 10, which may improve the user's experience and may reduce the space required for carrying the display device 100.

Referring to FIGS. 3-8, in one embodiment, the second end of the first retractable part 331 may include a first fixed pulley 41. The second end of the first flexible connecting component 35 may be wound around the side of the first fixed pulley 41 facing toward an expanding direction of the flexible display screen 20.

In one embodiment, to ensure the smooth movement between the first flexible connecting component 35 and the second end of the first retractable part 331 overlapped therewith, the second end of the first retractable part 331 may include the first fixed pulley 41. In view of this, configuring the second end of the first flexible connecting component 35 to be wound around the second end of the first retractable part 331 may include that the second end of the first flexible connecting component 35 may be wound around the side of the first fixed pulley 41 facing toward an expanding direction of the flexible display screen 20.

The first fixed pulley 41 may be equivalent to an overlapping part, which may be configured for the first flexible connecting component 35 to make the middle portion thereof overlap with the first fixed pulley 41. After the first end of the first flexible connecting component 35 is wound on the second reel 34 and the second end of the first flexible connecting component 35 is fixed to the second retractable part 332 disposed adjacent to the first retractable part 331, there is tension between each of the first end and the second end of the first flexible connecting component 35 and the first fixed pulley 41. Therefore, when the second reel 34 rotates, the second retractable part 332 connected to the second end of the first flexible connecting component 35 may be driven to slide, such that the second retractable part 332 may drive the flexible display screen 20 fixed to the second retractable part 332 to expanded or retracted. When the flexible display screen 20 is in the expanded state, the second retractable part 332 may be configured to support the flexible display screen 20, to facilitate user's use. When the flexible display screen 20 is in the retracted state, the entire display device 100 may occupy a substantially small space, which may facilitate user to carry.

Referring to FIGS. 3-8, in one embodiment, the second end of at least a portion of the second retractable parts 332 may include a second fixed pulley 42. The second end of the second flexible connecting component 36 may be wound around the side of the second fixed pulley 42 facing toward an expanding direction of the flexible display screen 20.

In one embodiment, when the first retractable component 31 includes at least two second retractable parts 332, and the second flexible connecting component 36 needs to be provided, in addition to providing the first fixed pulley 41 for overlapping with the first flexible connecting component 35, the second fixed pulley 42 may be provided at the second end of the second retractable part 332 for overlapping with the second flexible connecting component 36.

In one embodiment, referring to FIG. 7, when the first retractable component 31 includes one first retractable part 331 and two second retractable parts 332, the two second retractable parts 332 may include the first sub-second retractable part 3321 and the second sub-second retractable part 3322. The first sub-second retractable part 3321 may be disposed between the first retractable part 331 and the second sub-second retractable part 3322. In view of this, the first end of the second flexible connecting component 36 may be fixed to the first end of the first retractable part 331, and the second end of the second flexible connecting component 36 may be fixed to the first end of the second sub-second retractable part 3322 after being wound around the second fixed pulley 42 provided on the first sub-second retractable part 3321. In other words, after the second flexible connecting component 36 overlaps with the second fixed pulley 42 provided on the first sub-second retractable part 3321, both the first end and the second end of the second flexible connecting component 36 may move toward a direction away from the second end of the first sub-second retractable part 3321 and close to the first end of the first sub-second retractable part 3321. Ultimately, the first end of the second flexible connecting component 36 may be fixed to the first end of the first retractable part 331, and the second end of the second flexible connecting component 36 may be fixed to the first end of the second sub-second retractable part 3322. It should be added that in view of this, the second fixed pulley 42 may merely be disposed at the second end of the first sub-second retractable part 3321, and the second fixed pulley 42 may not need to be disposed on the second sub-second retractable part 3322.

In another embodiment, referring to FIG. 8, when the first retractable component 31 includes one first retractable part 331 and three second retractable parts 332, two second flexible connecting components 36 may need to be provided. For example, the three second retractable parts 332 arranged in the second direction and sequentially disposed on the side away from the first retractable part 331 may include $1^{st}$ second retractable part 332, $2^{nd}$ second retractable part 332 and $3^{rd}$ second retractable part 332, respectively. The $1^{st}$ second retractable part 332 may be located between the first retractable part 331 and the $2^{nd}$ second retractable part 332, and the $2^{nd}$ second retractable part 332 may be located between the $1^{st}$ second retractable part 332 and the $3^{rd}$ second shrink 332.

In view of this, the first end of the first flexible connecting component 35 may be wound on the second reel 34, and the second end of the first flexible connecting component 35 may be fixed to the first end of the $1^{st}$ second retractable part 332 after being wound on the first fixed pulley 41 provided on the second end of the first retractable part 331.

The first end of the $1^{st}$ second flexible connecting component 36 may be fixed on the first end of the first retractable part 331, and the second end of the $1^{st}$ second flexible connecting component 36 may be fixed to the first end of the $2^{nd}$ second retractable part 332 after being wound around the second fixed pulley 42 provided on the second end of the $1^{st}$ second retractable part 332. The first end of the $2^{nd}$ second flexible connecting component 36 may be fixed to the first end of the $1^{st}$ second retractable part 332, and the second end of the second flexible connecting component 36 may be fixed to the first end of the $3^{rd}$ second retractable part 332 after being wound around the second fixed pulley 42 provided on the second end of the $2^{nd}$ second retractable part 332. It should be noted that in view of this, the second fixed pulleys 42 may need to be disposed on the second end of the $1^{st}$ second retractable part 332 and the second end of the $2^{nd}$ second retractable part 332, respectively, and the second fixed pulley 42 may not need to be provided on the $3^{rd}$ second retractable part 332.

The second fixed pulley 42 may have the same function as the first fixed pulley 41, and may be equivalent to an overlapping part for the second flexible connecting component 36 to make the middle portion overlap with the second fixed pulley 42, which may facilitate to drive the sliding of the second retractable parts 332 connected to the second flexible connecting component 36. Therefore, the second retractable parts 332 may be retracted to the inside of the case 10 or expanded to the outside of the case 10 according to practical applications, to achieve auxiliary storage or support of the flexible display screen 20, thereby improving the user's experience under different needs.

It should be noted that for illustrative purposes, the first retractable component 31 may include two second retractable parts 332 and one second flexible connecting component 36, or the first retractable component 31 may include three second retractable parts 332 and two second flexible connecting components 36 as an example, which may not intend to limit the quantity of the second retractable parts 332 and the quantity of the second flexible connecting components 36 included in the first retractable component 31. The quantity of the second retractable parts 332 and the quantity of the second flexible connecting components 36 may be adjusted according to practical applications, as long as each second retractable part 332 is capable of being expanded to the outside of the case 10 or retracted to the inside of the case 10 when needed.

Referring to FIGS. 9-11, in one embodiment, the second end of the first retractable part 331 may include the first fixed pulley 41, the second end of at least a portion of the second retractable parts 332 may include the second fixed pulley 42, and the first end of at least a portion of the second retractable parts 332 may include a third fixed pulley 43.

The second end of the first flexible connecting component 35 may be first wound around the side of the first fixed pulley 41 facing toward the expanding direction of the flexible display screen 20, and then may be sequentially wound around the side of the third fixed pulley 43 on each of the M−1 second retractable parts 332 facing away from the expanding direction of the flexible display screen 20 and the side of the second fixed pulley 42 on each of the M−1 second retractable parts 332 facing toward the expanding direction of the flexible display screen 20.

In one embodiment, when the first retractable component 31 includes two or more second retractable parts 332 and merely includes one second flexible connecting component 36, the first fixed pulley 41 may be provided at the second end of the first retractable part 331, and the second fixed pulley 42 and the third fixed pulley 43 may be provided at the second end and the first end of each of the remaining second retractable parts 332 that are disposed between the first retractable part 331 and the second retractable part 332 farthest from the first retractable part 331, respectively.

Referring to FIG. 9 and FIG. 10, the first retractable component 31 may include three second retractable parts 332 that are arranged in sequence as an example. In other words, the $1^{st}$ second retractable part 332, the $2^{nd}$ second retractable part 332, and the $3^{rd}$ second retractable part 332 may be sequentially arranged on one side of the first retractable part 331. After being wound around the side of the first fixed pulley 41 disposed at the second end of the first retractable part 331 facing toward the expanding direction of the flexible display screen 20, the second end of the first flexible connecting component 35 may be wound around the side of the third fixed pulley 43 disposed at the first end of the $1^{st}$ second retractable part 332 facing away from the expanding direction of the flexible display screen 20, may be wound around the side of the second fixed pulley 42 disposed at the second end of the $1^{st}$ second retractable part 332 facing toward the expanding direction of the flexible display screen 20, may be wound around the side of the third fixed pulley 43 disposed at the first end of the $2^{nd}$ second retractable part 332 facing away from the expanding direction of the flexible display screen 20, may be wound around the side of the second fixed pulley 42 disposed at the second end of the $2^{nd}$ second retractable part 332 facing toward the expanding direction of the flexible display screen 20, and ultimately may be fixed to the first end of the $3^{rd}$ second retractable part 332.

In view of this, the rotation of the second reel 34 may wind or unwind the first end of the first flexible connecting component 35, and then may drive the sliding of each second retractable part 332 through the movement of the stress positions where the first flexible connecting component 35 overlaps with the first fixed pulley 41, each second fixed pulley 42 and each third fixed pulley 43. Therefore, the second retractable parts 332 may be retracted to the inside of the case 10 or expanded to the outside of the case 10 according to practical applications, to achieve auxiliary storage or support of the flexible display screen 20, thereby improving the user's experience under different needs.

Referring to FIG. 3, FIG. 6, FIGS. 9-10, in one embodiment, the flexible display screen 100 may further include an overlapping component 50. In the first retractable component 31 and the second retractable component 32, at least part of the two retractable parts 33 that are symmetrically arranged may be fixedly connected through the overlapping component 50. The overlapping component 50 may be fixed to the end of the retractable part 33 facing toward the expanding direction of the flexible display screen 20.

In one embodiment, when the display device 100 includes the first retractable component 31 and the second retractable component 32 that are arranged symmetrically, referring to FIG. 3 and FIG. 6, the overlapping component 50 may be merely provided at the second end of the second retractable part 332 farthest from the first retractable part 331. In other words, the overlapping component 50 may connect the second retractable parts 332 that are farthest from the first retractable part 331 in the first retractable component 31 and the second retractable component 32. Therefore, the first retractable component 31 and the second retractable component 32 may be connected through the overlapping component 50, which may improve the stability of the retractable component 30, and may improve the supporting effect for the flexible display screen 20 when the retractable component 30 is in the expanded state.

When the display device 100 includes the first retractable component 31 and the second retractable component 32 that are symmetrically arranged, referring to FIG. 9 and FIG. 10, the first retractable part 331 in the first retractable component 31 may be connected to the first retractable part 331 in the second retractable component 32. In other words, the first retractable part 331 in the first retractable component 31 and the first retractable part 331 in the second retractable component 32 may be made as an entity. The two second retractable parts 332 that are symmetrically arranged in the first retractable component 31 and the second retractable component 32 may be connected through the overlapping component 50, such that the first retractable component 31 and the second retractable component 32 may be connected through the overlapping component 50, which may improve the stability of the retractable component 30, and may improve the supporting effect for the flexible display screen 20 when the retractable component 30 is in the expanded state.

It should be noted that in view of this, the second retractable parts 332 in the first retractable component 31 may be arranged on the side of the first retractable part 331 in the first retractable component 31 away from the second retractable component 32. The second retractable parts 332 in the second retractable component 32 may be arranged on the side of the first retractable part 331 in the second retractable component 32 away from the first retractable component 31.

Referring to FIG. 3, FIG. 6, and FIGS. 9-10, in one embodiment, the display device 100 may further include a second driving motor 60. The second driving motor 60 may be configured to drive the first reel 11 to wind or unwind the flexible display screen 20. The first driving motor 37 and the second driving motor 60 may rotate at a same frequency.

In one embodiment, the display device 100 may further include the second driving motor 60. The second driving motor 60 may be configured to connect the first reel 11, to drive the first reel 11 to wind the flexible display screen 20, or to drive the first reel 11 to unwind the flexible display screen 20.

In view of this, in the disclosed embodiments, the second driving motor 60 for driving the first reel 11 and the first driving motor 37 for driving the second reel 34 may rotate at the same frequency during operation. Therefore, the expanding rate of the retractable component 30 may be the same as the expanding rate of the flexible display screen 20, and the retracting rate of the retractable component 30 may be the same as the retracting rate of the flexible display screen 20. The retractable component 30 and the flexible display screen 20 fixed to the retractable component 30 may be driven at the same frequency, which may avoid the damage on the flexible display screen 20 caused by too fast/too slow movement of the retractable component 30.

It should be noted that when merely one overlapping component 50 is disposed between the first retractable component 31 and the second retractable component 32 in the display device 100, and the overlapping component 50 is merely connected with the second retractable parts 332 farthest from the first retractable part 331 in the first retractable component 31 and the second retractable component 32, two first driving motors 37 may be provided. One first driving motor may be configured to drive the first retractable component 31, and the other first driving motor may be configured to drive the second retractable component 32. In view of this, the two first driving motors 37 may be set to rotate at the same frequency during operation, such that the symmetrically arranged first retractable component 31 and the second retractable component 32 may move stably at the same time, which may avoid the damage on the flexible display screen 20 caused by too fast/too slow movement of the retractable component 30.

Based on this, in the disclosed embodiments, the second retractable parts 332 in the first retractable component 31 may be disposed on the side of the first retractable part 331 in the first retractable component 31 close to the second retractable component 32, and the second retractable parts 332 in the second retractable component 32 may be disposed on the side of the first retractable part 331 in the second retractable component 32 close to the first retractable component 31. In view of this, the required length of the overlapping component 50 may be reduced, which may facilitate to reserve enough space for the disposure of the two first driving motors 37.

Figure 12:
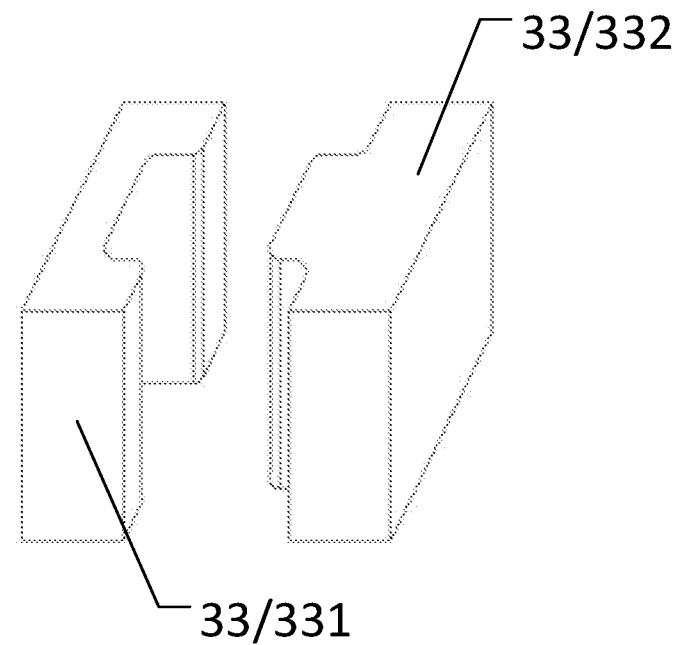
FIG. 12 illustrates a schematic diagram of two retractable parts that are adjacently disposed consistent with disclosed embodiments of the present disclosure.

FIG. 12 illustrates a schematic diagram of two retractable parts that are adjacently disposed consistent with disclosed embodiments of the present disclosure. Referring to FIGS. 1-12, the side of each retractable part 33 close to another adjacently disposed retractable part 33 may include a concave portion or a convex portion that are matched. The concave portion and the convex portion may be configured for the sliding connection between the two adjacent retractable parts 33.

In one embodiment, the concave portion and the convex portion may be disposed on the two adjacent retractable parts 33, respectively, to form a structure that is capable of engaging with each other. The two adjacent retractable parts 33 may be appropriately fixed through such engaging structure, and may be capable of sliding with respect to each other. Therefore, the first flexible connecting component 35/the second flexible connecting component 36 may pull the retractable parts 33 connected thereto to achieve the corresponding sliding.

It should be noted that the structure that is capable of engaging with each other formed by respectively disposing the concave portion and the convex portion on the two adjacent retractable parts 33 may be merely an example, and the user may adjust the structural relationship between the two adjacent retractable parts 33 according to practical applications and related technologies, as long as it may be ensured that the two adjacent retractable parts 33 are capable of sliding with respect to each other when needed.

Referring to FIG. 1 and FIG. 2, in one embodiment, the case 10 may further include a first opening portion 70 disposed along an extending direction of the first reel 11. The flexible display screen 20 may be expanded or retracted through the first opening portion 70. The retractable component 30 may be expanded or retracted through the first opening portion 70.

In one embodiment, the first opening portion 70 may need to be formed on the case 10 of the display device 100. Because the first opening portion 70 may be configured for expanding or retracting the flexible display screen 20 and the retractable component 30, an extending direction of the first opening portion 70 may be the same as the extending direction of the first reel 11, and the size of the first opening portion 70 may be set to be slightly larger than the size of the flexible display screen 20 and the size of the retractable component 30, such that the flexible display screen 20 and the retractable component 30 may be substantially stably expanded or retracted through the first opening portion 70, which may prevent the first opening portion 70 from scratching the flexible display screen 20 or the retractable component 30, and may prevent damages on the flexible display screen 20 and the retractable component 30 when being expanded or retracted through the first opening portion 70.

In addition, in one embodiment, a cleaning brush (not shown) may be provided in the display device 100. The cleaning brush may be fixed inside the case 10, and the bristle surface of the cleaning brush may face the display surface of the flexible display screen 20. The bristles of the cleaning brush may be in contact with the flexible display screen 20. Therefore, when the flexible display screen 20 is in the expanding process and the shrink process, the bristles of the cleaning brush may clean the display surface of the flexible display screen 20, to keep the desired display effect of the display device 100 and to improve the user's experience. At the same time, foreign impurities may be prevented from entering the case 10 of the display device 100 to cause damages on various devices in the display device 100, which may ensure the yield of the display device 100, and may increase the service life of the display device 100.

In one embodiment, the length of the bristles on the cleaning brush may be set to be greater than or equal to the width of the flexible display screen 20, such that every position of the flexible display screen 20 may be cleaned by the cleaning brush, which may ensure the cleaning effect of the flexible display screen 20 by the cleaning brush.

It should be noted that the first reel 11 may include a rotating shaft and a rotating drum, and the rotating drum may be fixed on the surface of the rotating shaft. Along the extending direction of the rotating shaft, the second driving motor 60 may be fixedly connected to at least one end of the rotating shaft. The first end of the flexible display screen 20 may be fixed on the surface of the rotating drum away from the rotating shaft, and the rotating drum may be configured to expand or shrink the flexible display screen 20 under the driving of the second driving motor 60.

Figure 13:
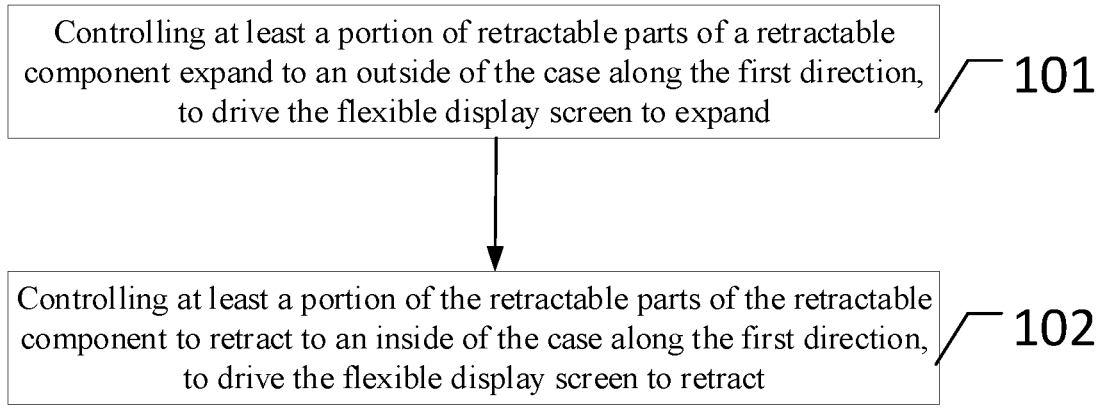
FIG. 13 illustrates a schematic flowchart of an exemplary driving method of a display device consistent with disclosed embodiments of the present disclosure.

The present disclosure also provides a driving method of a display device. FIG. 13 illustrates a schematic flowchart of the driving method of the display device consistent with disclosed embodiments of the present disclosure. Referring to FIGS. 1-13, the driving method of the display device 100 may be applied to the above-disclosed display device 100. The driving method may include following.

Step 101: controlling at least a portion of the retractable parts 33 of the retractable component 30 to be expanded to the outside of the case 10 along the first direction, to drive the flexible display screen 20 to be expanded.

Step 102: controlling at least a portion of the retractable parts 33 of the retractable component 30 to retract to the inside of the case 10 along the first direction, to drive the flexible display screen 20 to retract.

In one embodiment, the driving method of the display device 100 may include step 101. By turning on the first driving motor 37, the first driving motor 37 may drive the second reel to rotate, to drive at least a portion of the retractable parts 33 in the first retractable component 31 and the second retractable component 32 to be expanded to the outside of the case 10 along the first direction, and at the same time, may drive the flexible display screen 20 fixed with the first retractable component 31 and the second retractable component 32 to be expanded to the outside of the case 10. Further, the second driving motor 60 and the first driving motor 37 may be simultaneously turned on and may rotate at the same frequency, to drive the first reel 11 to unwind the flexible display screen 20.

The driving method of the display device 100 may further include step 102. By turning on the first driving motor 37, the first driving motor 37 may drive the second reel to rotate, to drive the portion of the retractable parts 33 in the first retractable component 31 and the second retractable component 32 originally located outside of the case 10 to retract to the inside of the case 10 along the first direction, and at the same time, may drive the flexible display screen 20 fixed with the first retractable component 31 and the second retractable component 32 to retract to the inside of the case 10. Further, the second driving motor 60 and the first driving motor 37 may be simultaneously turned on and may rotate at the same frequency, to drive the first reel 11 to wind the flexible display screen 20.

In the disclosed embodiments, the display device 100 may include at least one retractable component 30, and the at least one retractable component 30 may include a plurality of retractable parts 33. By expanding at least a portion of the retractable parts 33, the retractable component 30 may support the expanded flexible display screen 20. By retracting at least a portion of the retractable parts 33, at least a portion of the retractable component 30 may be retracted to the inside of the case 10 while retracting the flexible display screen 20 to the inside of the case 10 of the display device 100. Therefore, the display device 100 may be prevented from occupying too much space, to achieve the storage function of the display device 100, and to make the display device 100 substantially portable. The display device 100 may still maintain a flat display when being used for display, which may be suitable for the user's habits, and may avoid the problem where a portion of the display screen is blocked caused by partial rolling of the flexible display screen 20 when being expanded.

It should be noted that the display device 100 in the disclosed embodiments may include a mobile phone, a tablet computer, a television, a monitor, a notebook computer, a navigator, and any product or component with display function.

The disclosed embodiments may have following beneficial effects. In the disclosed display device and the driving method thereof, the display device may include at least one retractable component, and the first retractable component in the at least one retractable component may include two or more retractable parts. By expanding at least a portion of the retractable parts, the retractable component may support the expanded flexible display screen. By retracting at least a portion of the retractable parts, at least a portion of the retractable component may be retracted to the inside of the case while retracting the flexible display screen to the inside of the case of the display device. Therefore, the display device may be prevented from occupying too much space, to achieve the storage function of the display device, and to make the display device substantially portable. The display device may still maintain a flat display when being used for display, which may be suitable for the user's habits, and may avoid the problem where a portion of the display screen is blocked caused by partial curling of the flexible display screen when being expanded.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A display device, comprising:
a case and a first reel, wherein the first reel is located inside the case;
a flexible display screen, wherein the flexible display screen is capable of being wound on the first reel, and is retractable or expandable along a first direction according to rotation of the first reel; and
a retractable component, disposed on a non-light-exiting surface of the flexible display screen and configured to support the flexible display screen to retract or expand, wherein:
the retractable component includes a first retractable component, and the first retractable component includes N retractable parts that are capable of sliding with respect to each other along the first direction, wherein N is a positive integer greater than or equal to 2,
when the flexible display screen is expanded, the N retractable parts of the retractable component are expanded along the first direction and are arranged along a second direction, wherein the second direction intersects the first direction, and
when the flexible display screen is retracted, the N retractable parts of the retractable component are arranged in sequence along the second direction.

2. The display device according to claim 1, wherein:
the retractable component further includes a second retractable component, wherein the first retractable component and the second retractable component have a same structure.

3. The display device according to claim 2, wherein:
the first retractable component and the second retractable component are disposed symmetrically.

4. The display device according to claim 1, wherein:
the N retractable parts include one first retractable part and M second retractable parts, wherein N=M+1, and M is a positive integer greater than or equal to 1, wherein:
  when the flexible display screen is in a retracted state, the one first retractable part and the M second retractable parts are arranged in sequence along the second direction, wherein an end of a retractable part of the N retractable parts close to the case is a first end, and another end of the retractable part facing toward an expanding direction of the flexible display screen is a second end, and
  when the flexible display screen is in an expanding process, the first retractable part remains stationary, and the M second retractable parts move in sequence along the first direction, wherein a first end of a second retractable part of the M second retractable parts adjacent to the first retractable part moves along the first direction to approach a second end of the first retractable part, and a second end of the second retractable part moves along the first direction away from the second end of the first retractable part.

5. The display device according to claim 4, wherein:
the N retractable parts include one first retractable part and M second retractable parts, wherein M is a positive integer greater than or equal to 2; and
the M second retractable parts include $i^{th}$ second retractable part adjacent to the first retractable part and $(i+1)^{th}$ second retractable part away from the first retractable part, wherein $1 \leq i < i+1 \leq M$, and i is a positive integer, wherein:
  when the flexible display screen is in the expanding process, the first retractable part remains stationary, and the $(i+1)^{th}$ second retractable part moves as the $i^{th}$ second retractable part moves, and
  a first end of the $(i+1)^{th}$ second retractable part moves along the first direction to approach a second end of the $i^{th}$ second retractable part, and a second end of the $(i+1)^{th}$ second retractable part moves along the first direction away from the second end of the $i^{th}$ second retractable part.

6. The display device according to claim 4, wherein:
the first retractable component further includes a second reel and a first flexible connecting component, wherein:
  when the flexible display screen is in the retracted state, a first end of the first flexible connecting component is wound on the second reel, and a second end of the first flexible connecting component is fixed to the first end of the second retractable part adjacent to the first retractable part after being wound around the second end of the first retractable part,
  when the flexible display screen is in the expanding process, the second reel winds the first flexible connecting component, and the first flexible connecting component pulls the second retractable part to move along the first direction, to enable at least a portion of the second retractable part to be expanded to an outside of the case, and
  when the flexible display screen is in a retracting process, the second reel unwinds the first flexible connecting component, and the second retractable part moves away from the first direction, to enable at least a portion of the second retractable part to retract to an inside of the case.

7. The display device according to claim 6, wherein:
the first retractable component further includes a first driving motor, wherein the first driving motor drives the second reel to wind the first flexible connecting component, or drives the second reel to unwind the first flexible connecting component.

8. The display device according to claim 6, wherein:
when the first retractable component includes at least two second retractable parts, the retractable component further includes at least one second flexible connecting component, wherein:
  the at least two second retractable parts include a first sub-second retractable part and a second sub-second retractable part that are arranged along the second direction and disposed adjacent to each other, wherein the first sub-second retractable part is disposed adjacent to the first retractable part, and the second sub-second retractable part is disposed on a side of the first sub-second retractable part away from the first retractable part,
  a first end of a second flexible connecting component of the at least one second flexible connecting component is fixed to a first end of the first retractable part, and a second end of the second flexible connecting component is fixed to a first end of the second sub-second retractable part after being wound around a second end of the first sub-second retractable part,
  when the flexible display screen is expanded, the second end of the second flexible connecting component drives each second retractable part connected to the second flexible connecting component to move with respect to the first retractable part or the second retractable part, to enable at least a portion of each second retractable part to be expanded to the outside of the case, and
  when the flexible display screen is retracted, each second retractable part moves away from the first direction, to enable each second retractable part to retract to the inside of the case.

9. The display device according to claim 6, wherein:
when the first retractable component includes at least two second retractable parts, the retractable component further includes at least one second flexible connecting component; and
the N retractable parts include M second retractable parts, wherein M is a positive integer greater than or equal to 3, wherein:
  a plurality of second retractable parts of the M second retractable parts arranged along the second direction and disposed away from the first retractable part include j second retractable parts, wherein j is a positive integer greater than or equal to 3, and
  a first end of the $(j-2)^{th}$ second retractable part is fixedly connected to a first end of a second flexible connecting component of the at least one second flexible connecting component, and a second end of the second flexible connecting component is fixed to a first end of the $j^{th}$ second retractable part after being wound around to second end of the $(j-1)^{th}$ second retractable part.

10. The display device according to claim 6, wherein:
when the first retractable component includes at least two second retractable parts, the N retractable parts include M second retractable parts, wherein M is a positive integer greater than or equal to 2, wherein:
  when the flexible display screen is in the retracted state, the first end of the first flexible connecting component is wound on the second reel, and the second end of the first flexible connecting component is fixed to a first end of the $M^{th}$ second retractable part after being wound around the second end of the first retractable part, and around a first end and a second end of each of M−1 second retractable parts sequentially disposed on a side of the first retractable part, when the flexible display screen is in the expanding process, the second reel winds the first flexible connecting component, and the first flexible connecting component drive each second retractable part connected to the first flexible connecting component to move with respect to the first retractable part or the second retractable part, to enable at least a portion of each second retractable part to be expanded to the outside of the case, and when the flexible display screen is in the retracting process, the second reel unwinds the first flexible connecting component, and each second retractable part moves away from the first direction, to enable each second retractable part to retract to the inside of the case.

11. The display device according to claim 6, wherein:
the second end of the first retractable part includes a first fixed pulley, wherein the second end of the first flexible connecting component is wound around a side of the first fixed pulley facing toward an expanding direction of the flexible display screen.

12. The display device according to claim 8, wherein:
a second end of each of at least a portion of the at least two second retractable parts includes a second fixed pulley, wherein the second end of the second flexible connecting component is wound around a side of the second fixed pulley facing toward an expanding direction of the flexible display screen.

13. The display device according to claim 10, wherein:
the second end of the first retractable part includes a first fixed pulley, the second end of each of at least a portion of the at least two second retractable parts includes a second fixed pulley, and a first end of each of at least a portion of the at least two second retractable parts includes a third fixed pulley, wherein:
the second end of the first flexible connecting component is first wound around a side of the first fixed pulley facing toward an expanding direction of the flexible display screen, and then is sequentially wound around a side of the third fixed pulley on each of the M−1 second retractable parts facing away from the expanding direction of the flexible display screen and a side of the second fixed pulley on each of the M−1 second retractable parts facing toward the expanding direction of the flexible display screen.

14. The display device according to claim 3, wherein:
in the first retractable component and the second retractable component, at least a portion of two retractable parts that are symmetrically arranged are fixedly connected through an overlapping component, wherein the overlapping component is fixed to an end of a retractable part of the two retractable parts facing toward an expanding direction of the flexible display screen.

15. The display device according to claim 7, further including:
a second driving motor, wherein:
the second driving motor is configured to drive the first reel to wind or unwind the flexible display screen, and
the first driving motor and the second driving motor rotate at a same frequency.

16. The display device according to claim 1, wherein:
a side of each retractable part close to another adjacently disposed retractable part includes a concave portion or a convex portion that are matched, wherein the concave portion and the convex portion are configured for sliding connection between the two adjacent retractable parts.

17. The display device according to claim 1, wherein:
the case further includes a first opening portion disposed along an extending direction of the first reel; and
the flexible display screen is expanded or retracted through the first opening portion; and
the retractable component is expanded or retracted through the first opening portion.

18. A driving method of a display device, applied to the display device, wherein:
the display device includes:
a case and a first reel, wherein the first reel is located inside the case,
a flexible display screen, wherein the flexible display screen is capable of being wound on the first reel, and is retractable or expandable along a first direction according to rotation of the first reel, and
a retractable component, disposed on a non-light-exiting surface of the flexible display screen and configured to support the flexible display screen to retract or expand, wherein:
the retractable component includes a first retractable component, and the first retractable component includes N retractable parts that are capable of sliding with respect to each other along the first direction, wherein N is a positive integer greater than or equal to 2,
when the flexible display screen is expanded, the N retractable parts of the retractable component are expanded along the first direction and are arranged along a second direction, wherein the second direction intersects the first direction, and
when the flexible display screen is retracted, the N retractable parts of the retractable component are arranged in sequence along the second direction; and
the driving method includes:
controlling at least a portion of the retractable parts of the retractable component to be expanded to an outside of the case along the first direction, to drive the flexible display screen to be expanded, and
controlling at least a portion of the retractable parts of the retractable component to retract to an inside of the case along the first direction, to drive the flexible display screen to retract.

* * * * *